(12) United States Patent
Friedman et al.

(10) Patent No.: US 9,667,611 B1
(45) Date of Patent: May 30, 2017

(54) SITUATIONALLY AWARE AUTHENTICATION

(71) Applicant: EMC Corporation, Hopkinton, MA (US)

(72) Inventors: Lawrence N. Friedman, Arlington, MA (US); Yedidya Dotan, Newton, MA (US); Gareth Richards, Woodstock (GB); Daniel V. Bailey, Pepperell, MA (US); William M. Duane, Westford, MA (US); John G. Brainard, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 533 days.

(21) Appl. No.: 14/230,359

(22) Filed: Mar. 31, 2014

(51) Int. Cl.
*H04L 29/06* (2006.01)

(52) U.S. Cl.
CPC .................... *H04L 63/08* (2013.01)

(58) Field of Classification Search
CPC .......... G06F 21/44; G06F 21/31; G06F 21/32; G06F 21/35; H04W 12/06; H04W 36/14; H04W 36/22; H04L 63/08; H04L 9/3226
USPC ............................................................ 726/3
See application file for complete search history.

(56) References Cited

U.S. PATENT DOCUMENTS

| 7,548,886 | B2 | 6/2009 | Kirkland et al. | |
|---|---|---|---|---|
| 8,447,273 | B1 * | 5/2013 | Friedlander | H04M 1/72577 382/115 |
| 2013/0127591 | A1 * | 5/2013 | Shay | G07C 9/00087 340/5.52 |

\* cited by examiner

*Primary Examiner* — Tu Nguyen
(74) *Attorney, Agent, or Firm* — BainwoodHuang

(57) ABSTRACT

Improved techniques involve selecting a set of authentication factors from among multiple factors based on a current situation and information about how well the multiple authentication factors have worked in similar situations in the past. Along these lines, when an authentication system performs an authentication operation on a requesting party, the authentication system first assesses a situational environment. Based on the assessment of the situational environment, the authentication system decides that it is necessary to re-authenticate the requesting party. In some arrangements, the authentication system may determine which set of factors has the highest likelihood of successfully verifying the user's identity when compared with other authentication factors. The authentication system then carries out an authentication operation on the selected set of factors and bases a successful authentication result on whether the selected set of factors can be verified.

16 Claims, 6 Drawing Sheets

Siuational Authentication Table 242

*FIG. 3*

| Situations | ID Factor 1 | ID Factor 2 | ID Factor 3 | ... |
|---|---|---|---|---|
| Situation1 | 0.23 | 0.01 | 0.45 | |
| Situation2 | 0.01 | 0.54 | 0.33 | |
| Situation3 | 0.74 | 0.09 | 0.02 | |
| Situation4 | 0.32 | 0.34 | 0.31 | |
| Situation5 | 0.05 | 0.03 | 0.01 | |
| Situation6 | 0.54 | 0.87 | 0.41 | |
| ... | | | | |

320    310(1)    310(2)    310(3)

Rules Table 244

| Risk Level | Rule |
|---|---|
| Low | ALLOW_ALL |
| Medium | ADAPTIVE |
| High | SITUATIONALLY_AWARE |
| Very High | BLOCK_ALL |

SITUATIONALLY AWARE AUTHENTICATION

BACKGROUND

Authentication operations serve to check that a requestor requesting access to restricted resources is indeed that requestor. Authentication requestors can be applications, systems, embedded devices, devices, and are often people. Examples of authentication operations include username/password verification, one-time password verification, knowledge-based authentication, biometric-based authentication, and adaptive authentication.

Conventional authentication approaches involve employing one or more such authentication operations in response to a request to access restricted resources. For example, access to a gaming account on a smartphone may require simple username/password verification, but access to top-secret government or corporate information may require a combination of biometric and knowledge-based authentication.

SUMMARY

Unfortunately, there are deficiencies with the above-described conventional authentication approaches. For example, a thief can thwart such authentication approaches by observing user habits and stealing user credentials, or through the use of advanced persistent threats (APTs). For example, consider a situation in which the thief tries to access a bank account with an online banking application that performs authentication by checking for credentials stored in the legitimate user's cell phone. If the thief has stolen the cell phone, has accessed the credentials, and perhaps has learned the habits of the user, then any fixed authentication strategies and even some adaptive ones may yield false results.

In contrast with the above-described conventional authentication approaches, improved techniques involve selecting a set of authentication factors from among multiple factors based on a current situation and information about how well the multiple authentication factors have worked in similar situations in the past. Along these lines, when an authentication system performs an authentication operation on a requesting party, the authentication system first assesses a situational environment; such an assessment may be made on, for example, a continuous or periodic basis. Based on the assessment of the situational environment, the authentication system decides that it is necessary to re-authenticate the requesting party. In some arrangements, the authentication system may determine which set of factors has the highest likelihood of successfully verifying the user's identity when compared with other authentication factors. The authentication system then carries out an authentication operation on the selected set of factors and bases a successful authentication result on whether or to what extent the selected set of factors can be verified. In other arrangements, however, a system apart from the authentication system may determine which set of factors has the highest likelihood of successfully verifying the user's identity.

It should be understood that the requesting party for an authentication operation can be a user, system, device, or any party needing access to a protected resource.

Advantageously, the improved technique provides a dynamic authentication scheme that better defends against APTs. In the above example, when the current situation indicates that the user's cell phone has been stolen, the improved technique may recommend a KBA question or a biometric challenge, whereas adaptive authentication without a situationally aware process might erroneously conclude in this situation that the thief is the legitimate user.

One embodiment of the improved technique is directed to a method of authenticating a requesting party. The method includes receiving a request to authenticate the requesting party, the request being received during a current situation defined by current values of a set of situational parameters indicating a state of a situational environment internal and external to the requesting party, the set of situational parameters being evaluated as part of an authentication operation. The method also includes producing an authentication result based on the current values of the set of situational parameters. The method further includes authenticating the requesting party based on the authentication result.

Additionally, some embodiments of the improved technique are directed to an apparatus constructed and arranged to authenticate a requesting party. The apparatus includes a network interface, memory, and a controller including controlling circuitry constructed and arranged to carry out the method of authenticating a requesting party.

Furthermore, some embodiments of the improved technique are directed to a computer program product having a non-transitory computer readable storage medium that stores code including a set of instructions which, when executed by a computer, cause the computer to carry out the method of authenticating a requesting party.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 3 is a part of an example situational authentication table stored in the memory of the authentication server shown in FIG. 2.

FIG. 4 is another part of an example rules table stored in the memory of the authentication server shown in FIG. 2.

DETAILED DESCRIPTION

Improved techniques involve selecting a set of authentication factors from among multiple factors based on a current situation and information about how well the multiple authentication factors have worked in similar situations in the past. Along these lines, when an authentication system performs an authentication operation on a requesting party, the authentication system first assesses a situational environment; such an assessment may be made on, for example, a continuous or periodic basis. Based on the assessment of the situational environment, the authentication system decides that it is necessary to re-authenticate the requesting party. In some arrangements, the authentication system may determine which set of factors has the highest likelihood of successfully verifying the user's identity when compared with other authentication factors. The authentication system then carries out an authentication operation on the selected set of factors and bases a successful authentication result on whether or to what extent the selected set of factors can be verified. In other arrangements, however, a system apart from the authentication system may determine which set of factors has the highest likelihood of successfully verifying the user's identity.

Figure 1:
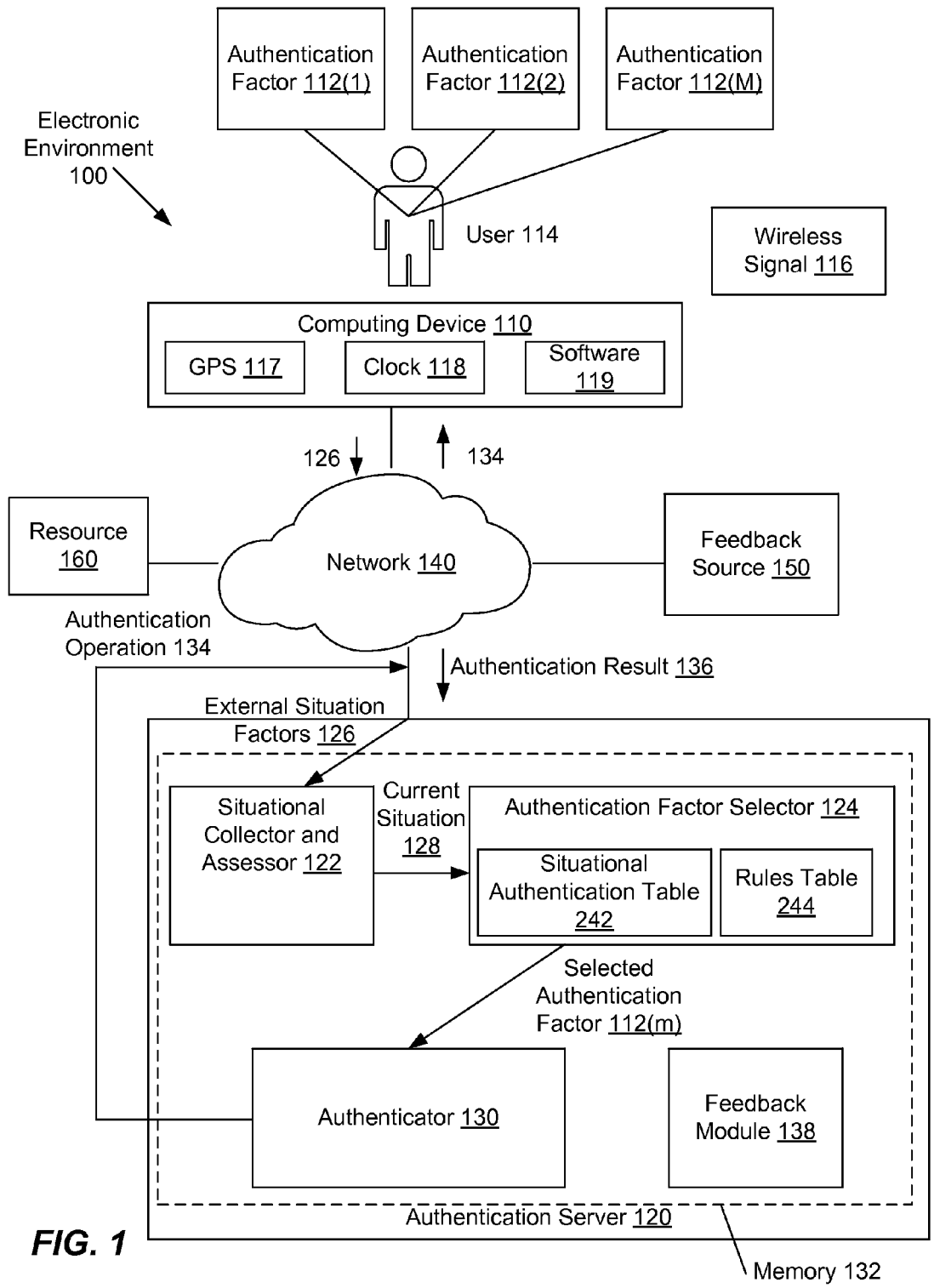
FIG. 1 is a block diagram illustrating an example electronic environment in which the improved technique is carried out.

FIG. 1 illustrates an example electronic environment 100 in which the improved techniques hereof are carried out. Electronic environment 100 includes a computing device 110 belonging to a user 114, an authentication server 120, a network 140, and a feedback server 150.

Computing device 110 is configured to transmit information to authentication server 120 as part of any number of authentication operations. For example, computing device 110 may contain a token that generates and sends one-time passwords to authentication server 120 upon request. Computing device 110 may take the form of a smartphone, a tablet computer, a desktop computer, a laptop computer, or the like; in some arrangements, however, computing device 110 may be an appliance for facilitating an authentication operation, e.g., a fingerprint scanner or the like.

User 114 has a number of authentication factors 112(1), 112(2), ..., 112(M) (authentication factors 112), which authentication server 120 may verify via authentication operation 134. Authentication factors 112 may be thought of as components of an overall authentication, which may be evaluated independently or in combination as needed. Examples of authentication factors 112 include the following: knowledge of answers to knowledge-based authentication (KBA) questions; a biometric such as fingerprint, voice tone and pattern, typing speed and pattern, facial recognition, heart rate, and the like; and possession of a device or token or other objects in an immediate environment.

Authentication server 120 is configured to assess a situational environment to determine a current situation. Authentication server 120 is also configured to select an authentication operation or combination of operations based on the current situation, and then carry out that selected operation. To this effect, authentication server 120 includes, within memory 132, a situational assessor module 122, an authentication factor selector module 124, an authenticator module 130, and a feedback module 138.

Situational collector and assessor 122 collects values of situational parameters and assesses a situational environment indicated by these values to determine a current situation 128 in which authentication server 120 is to carry out authentication operation 134. Situational collector and assessor 122 is configured to take in information such as external situation factors 126 taken from sensors, electronic information, and the like, and translate that information into one of a set of situations for input into authentication factor selector module 124.

A situation such as current situation 128 may be represented by values of any number of situational parameters. Each situational parameter has a finite number of possible values so that the number of possible situations would be the product of numbers of possible values of each parameter. Examples of such situational parameters may include whether there have been assessed threats (and the type of assessed threats), and the type of threat. Other examples of situational parameters may include external environmental information such as weather, war conditions, and global financial conditions. Still other examples of situational parameters may include the user's geolocation (e.g., taken from GPS 117), time of request (e.g., from clock 118), applications run (e.g., from software 119), biometric information such as heart rate, body temperature, and voice tone, and immediate environmental information such as room temperature, devices present (and whether those devices have been reported stolen), other objects present (e.g., family photos), and wireless signal strength 116.

Authentication factor selector 124 selects optimal authentication operation or operations based on current situation 128 determined by situational collector and assessor 122. To this effect, authentication factor selector 124 receives current situation 128 from situational assessor 122 and maps current situation 128 to a set of weights for authentication factors 112. Authentication factor selector 124 selects an authentication factor 112 to be verified based on the weights.

In some arrangements, the weight for an authentication factor 112 represents the likelihood of a successful authentication of user 114 given that authentication server 120 verified that authentication factor 112. For example, the weight may be a conditional probability that authentication of user 114 was successful given that authentication server 120 verified that authentication factor 112. In this case, authentication factor selector module 124 selects the authentication factor 112 that has the largest weight.

Authenticator 130 selects an authentication operation 134 for verifying authentication factor 112 and carrying out that operation 134. Along these lines, suppose that authentication factor selector 124 selects a voice tone to be verified based on current situation 128. Then authenticator 130 selects a voice tone comparison operation as authentication operation 134 and carries out this operation.

It should be understood that authentication operation 134 need not involve active participation on the part of user 114; in fact, in many cases, passive operations are preferred. Furthermore, a prompt for authentication server 120 may not come from a request on the part of user 114 but rather may be a part of a continuous authentication operation or a reaction to certain events.

Feedback module 138 updates weights in authentication factor selector 124 based on external data. For example, when the result of verifying authentication factor 112(1) in a particular situation has been shown (e.g., by investigation) to have led to successful authentication, in that user 114 was allowed access to a restricted resource when user 114 was the legitimate user and vice versa, feedback module 138 may increase the weight corresponding to authentication factor 112(1) for the particular situation. If, on the other hand, the result is unsuccessful in that user 114 was allowed access to a restricted resource when user 114 is not the legitimate user and vice versa, then that weight may be decreased.

Feedback source 150 is configured to obtain historical data for feedback module 150. Feedback source 150 may include a database that contains information about prior authentication operations and whether they were successful or not in verifying identities of users.

During an example operation, authentication server 120 receives external situation factors 126, which authentication server 120 sends to situational assessor module 122. For example, external situation factors 126 may reflect the fact that a user's cell phone has just been stolen or that there is a severe weather alert.

Situational assessor module 122 takes in external situation factors 126 and converts them into values of situational parameters that define current situation 128. For example, if values of situational parameters are normally indicated by continuous values, situational assessor module places those continuous values into discrete bins so that there are a large, but finite, number of possible situations. Situational assessor module 122 continues to update current situation 128 as it receives data through external situation factors 126.

At some point, user 114 attempts to access a restricted resource 160, which triggers an authentication request. Upon receiving this request, authentication factor selection module 124 maps current situation 128 to weights for each of authentication factors 112(1), . . . , 112(M). Authentication factor selection module 124 then selects an authentication factor, say, 112(m), based on the largest weight.

It should be understood that some authentication factors 112 may be a combination of individual factors, so that the selection of a factor 112 may not be simply the selection of a single authentication factor.

Once authentication factor 112(m) has been selected, authenticator module 130 selects an authentication operation 134 that verifies authentication factor 112(m). In some arrangements, authenticator module 130 performs a mapping between authentication factors 112 and corresponding authentication operations that are carried out for verification of those factors 112. For example, when factor 112 is knowledge of answers to KBA questions, then a possible operation 134 would involve KBA questions being asked. Also, if factor 112 is possession of a token, then a possible operation 134 would involve an adaptive authentication operation.

Authenticator module 130 then carries out selected authentication operation 134 to verify authentication factor 112(m). Once computing device 110 supplies data in response to authentication operation 134 being performed, computing device 110 provides an authentication result 136 to authentication server 120. Based on this result, authentication server 120 authenticates user 114.

It should be understood the various components illustrated in FIG. 1 can be separated and combined in a variety of ways. FIG. 1 as described above shows one illustrative example arrangement.

Figure 2:
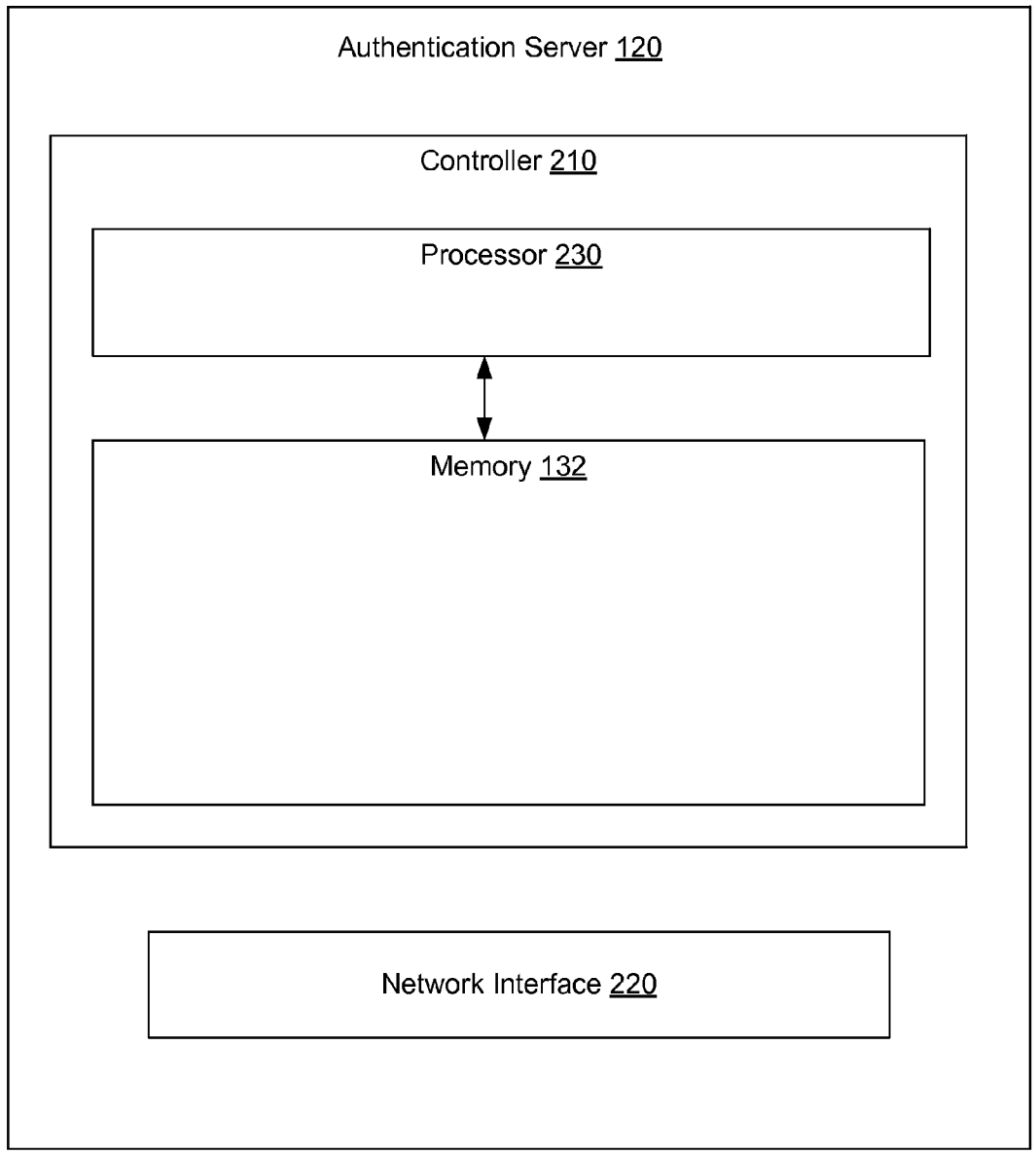
FIG. 2 is a block diagram illustrating an example authentication server within the electronic environment shown in FIG. 1.

FIG. 2 illustrates details of authentication server 120. Authentication server 120 includes controller 210, which in turn includes processor 230 and memory 240. Authentication server 120 also includes network interface circuitry 220.

Network interface circuitry 220 takes the form of an Ethernet card; in some arrangements, network interface circuitry 220 takes other forms including that of a wireless receiver, for example.

Processor 230 takes the form of, but is not limited to, one or more Intel or AMD-based CPUs, and can include a single or multiple cores each running single or multiple threads. Processor 230 is coupled to memory 240 and is configured to execute instructions from code 244, 246, 248, and 250.

Memory 240 is configured to store code from various applications running on authentication server 120. Memory 240 generally takes the form of, e.g., random access memory, although in some arrangements memory 240 includes flash memory or a non-volatile memory.

Memory 240 also stores a situational authentication table 242 that provides a mapping between enumerated situations and weights of various authentication factors 112 for use by authentication factor selection module 124. Further details of situational authentication table 242 are discussed in connection with FIG. 3 and FIG. 4.

FIG. 3 illustrates an example situational authentication table 242. Situational authentication table 242 as illustrated in FIG. 3 contains rows 320 corresponding to various situations and columns 310(1), 310(2), 310(3), . . . , each corresponding to an authentication factor 112. For example, for the situation named "Situation1", authentication factor 112(1) has a weight of 0.23, authentication factor 112(2) has a weight factor of 0.01, authentication factor 112(3) has a weight of 0.45, and so on. Similarly, for the situation named "Situation2", authentication factor 112(1) has a weight of 0.01, authentication factor 112(2) has a weight factor of 0.54, authentication factor 112(3) has a weight of 0.33, and so on.

It should be understood that each situation name is shorthand for values of numerous situational parameters that define a situation. The mapping of such values to a name may be accomplished either within authentication factor selection module 124 or situational assessor module 122.

It should also be understood that each weight may represent a conditional probability that authentication of an authentication factor 112 for a given situation 128 will result in successful validation of the identity of user 114. Because these numbers are conditional probabilities, the sum of the numbers across a row does not have to equal one. Thus, several, or all, factors 112 may all exhibit high probabilities of success; alternatively, all factors in a given situation may exhibit almost no chance of success.

FIG. 4 illustrates a rules table 244 having are two columns 410 and 420 and four rows, although in other arrangements there may be more rows.

Column 420 represents an external risk level, which may be an aggregation of external environmental conditions and the nature of the resource being protected by the authentication operation 134. Column 430 represents a rule that follows the external risk level in column 420. For example, if the threat level is low, then the rule "ALLOW_ALL" disposes with any authentication and allows for any user 114 to access the resources. If the threat level is medium, then authentications server 120 may perform an adaptive operation following the rule "ADAPTIVE". If the threat level is high, then authentication server 120 may perform a situationally aware authentication as described above. Finally, if the threat level is very high, then the rule "BLOCK_ALL" disposes with any authentication and blocks all requests for access.

Figure 5:
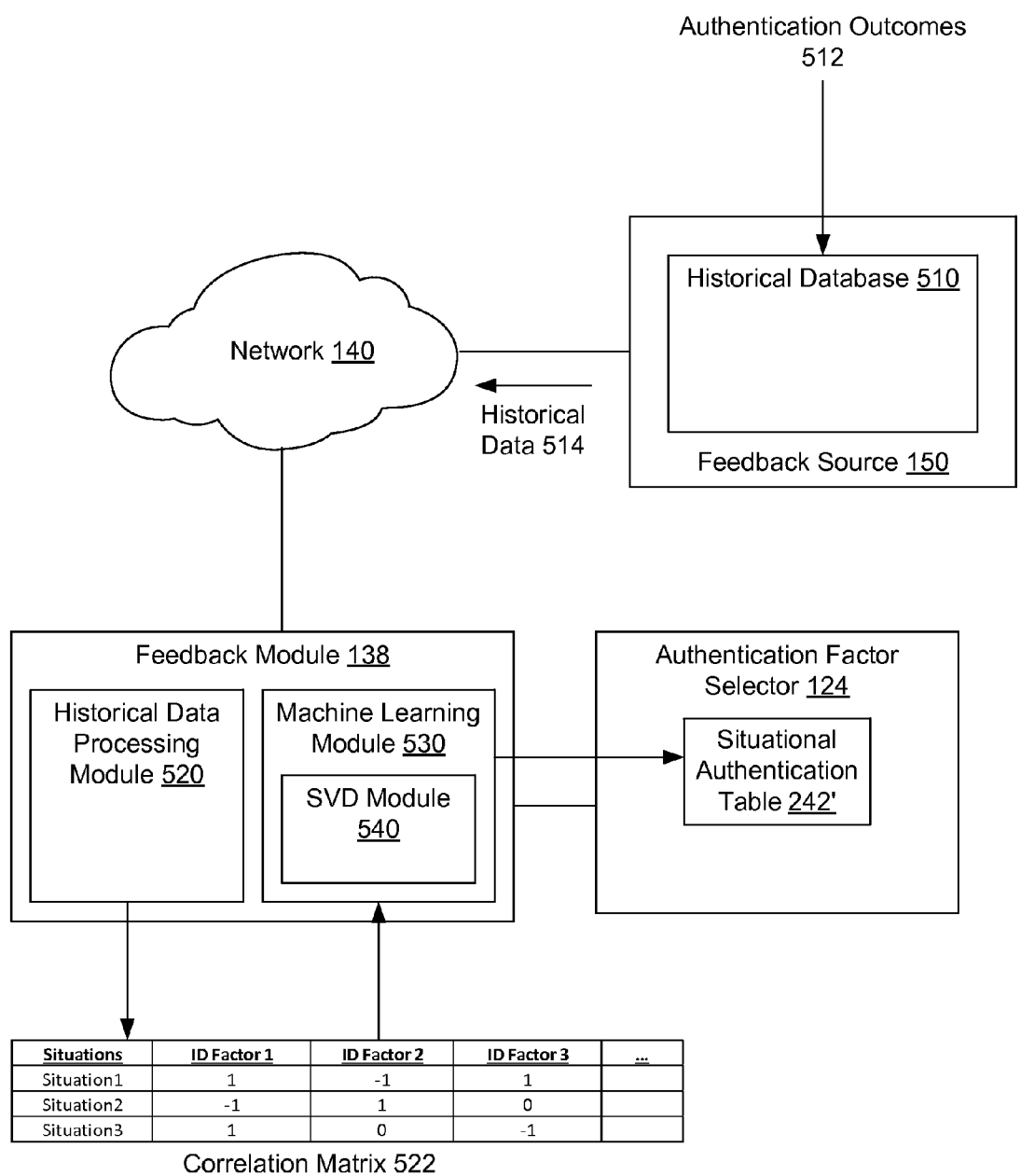
FIG. 5 is a block diagram illustrating an example feedback module within the authentication server shown in FIG. 2.

It should be understood that the numbers and rules derived in situational authentication table 242 and rules table 244, respectively, are typically derived empirically from real-world results. FIG. 5 shows an example of how the numbers and rules in situational authentication table 242 are derived.

FIG. 5 illustrates detail in connection with example feedback module 138 and example feedback source 150. Feedback module 138, as illustrated in FIG. 5, contains historical data processing module 520 and machine learning module 530. Feedback source 150 contains historical database 510.

Historical database 510 contains authentication outcomes 512 from user 114 in a variety of situations. Historical database 510 may be a structured or unstructured database such as Hadoop.

Historical data processor 520 receives historical data 514 from historical database 510 and generate a correlation matrix 522 for input into machine learning module 530. Historical data 514 includes, for example, situations, authentication factors used, and an indication of success or failure.

Correlation matrix 522 organizes historical data 514 into a structure usable for a machine learning algorithm within machine learning module 530. Each element of correlation matrix 522 is either a "1" indicating successful authentication, a "−1" indicating unsuccessful authentication, and "0" indicating no data.

Machine learning module 530 carries out a machine learning operation on correlation matrix 522 and situational authentication table 242. In one example, such a machine learning operation involves using a neural net algorithm that maps correlation matrix 522 to an adjustment of the weights in situational authentication table 242.

In some arrangements, machine learning module 530 includes a singular value decomposition (SVD) module 540. SVD module 540 carries out an SVD on an internal matrices generated during an execution of a neural net algorithm. Such an application of SVD on these matrices serves to expose the rank of the matrices and potentially lower the dimensionality of the machine learning problem. This in turns allows machine learning module 530 to find those situations and authentication factors that best correlate.

During an example operation, historical database 510 receives authentication outcomes 512 as a result of authentication operations performed in connection with user 144 over a variety of situations. At some point, feedback module 138 requests historical data 514 from historical database 510. Upon receiving historical data 514, feedback module 138 sends historical data to historical data processor 520.

After it has collected a sufficient amount of historical data 514, historical data processor 520 generates correlation matrix 522 and inputs correlation matrix 522 into machine learning module 530. Machine learning module 530 performs a machine learning operation on correlation matrix 522 and situational authentication table 242 to derive adjustments to the weights in situational authentication table 242.

It should be understood that machine learning module 530 may use any machine learning algorithm to accomplish the adjustment of the weights, e.g., genetic algorithm, unsupervised learning, etc. It should also be understood that data taken to assess the above-described situations may originate from any number of sources.

Figure 6:
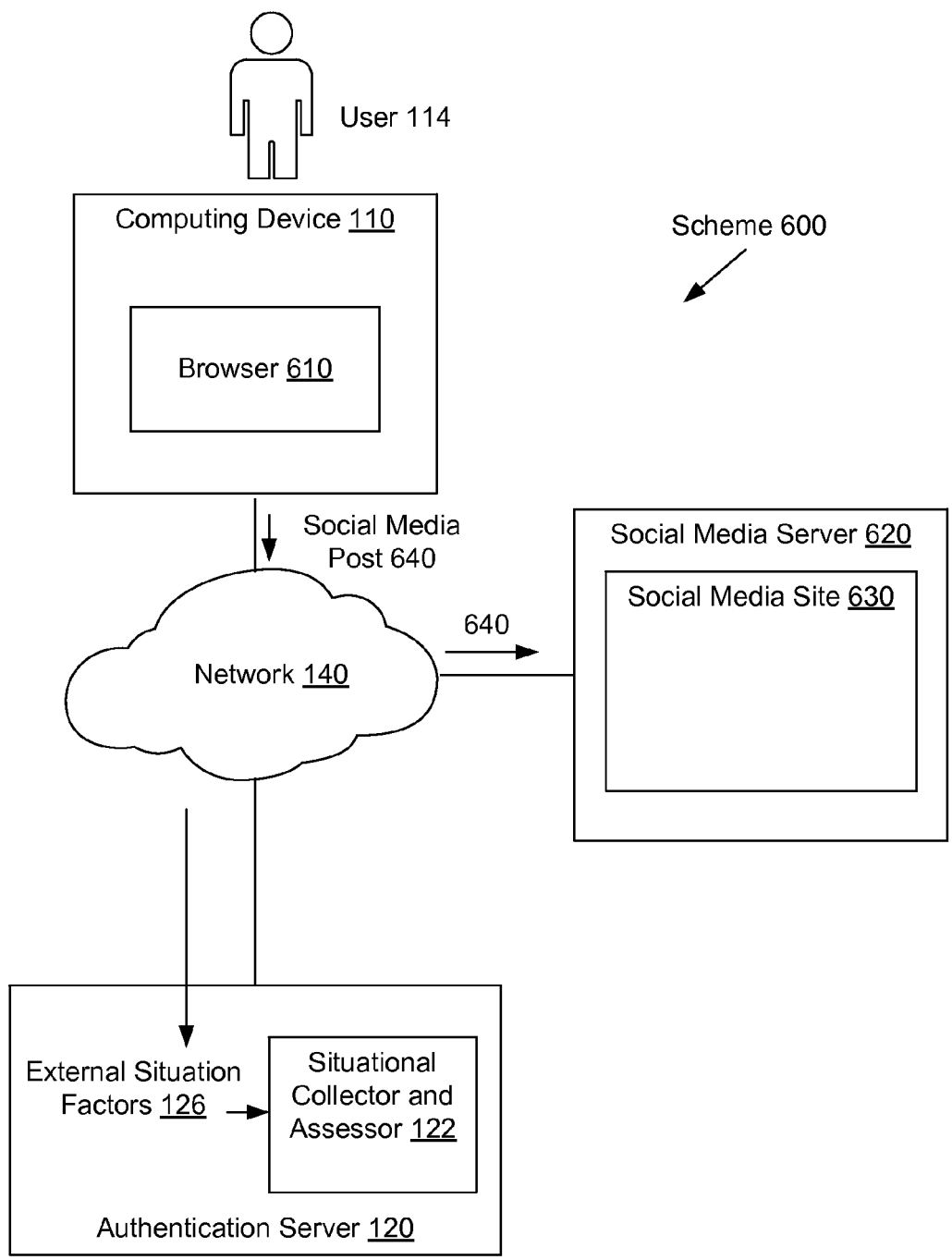
FIG. 6 is a block diagram illustrating an example situational assessor within the authentication server shown in FIG. 2.

FIG. 6 shows details about some classes of data sources for situational awareness. FIG. 6 illustrates an example scheme 600 for extracting situational data from social media. Scheme 600 involves the use of a social media server 620 that hosts a social media site 630, e.g., Twitter.

During an example operation, user 114 posts a social media post 640 through a browser 610 on computing device 110. This post gets uploaded to social media server 620 via social media site 630, which provides functionality for posting via a browser window on computing device 110.

Situational collector and assessor 122 monitors social media site 630 for particular keywords that may be of interest in authentication, such as "stolen", "credit card", and the like. Upon detection of such a post, situational collector and assessor 122 extracts the post from social media site 630 as an external situation factor 126.

As an example, suppose that user 114 just had a credit card stolen. (S)he types into Twitter on computing device 110 the post "My credit card was just stolen!" By monitoring such posts, authentication server 120 is able to update the current situation 128 to reflect a new element of risk in the environment.

Figure 7:
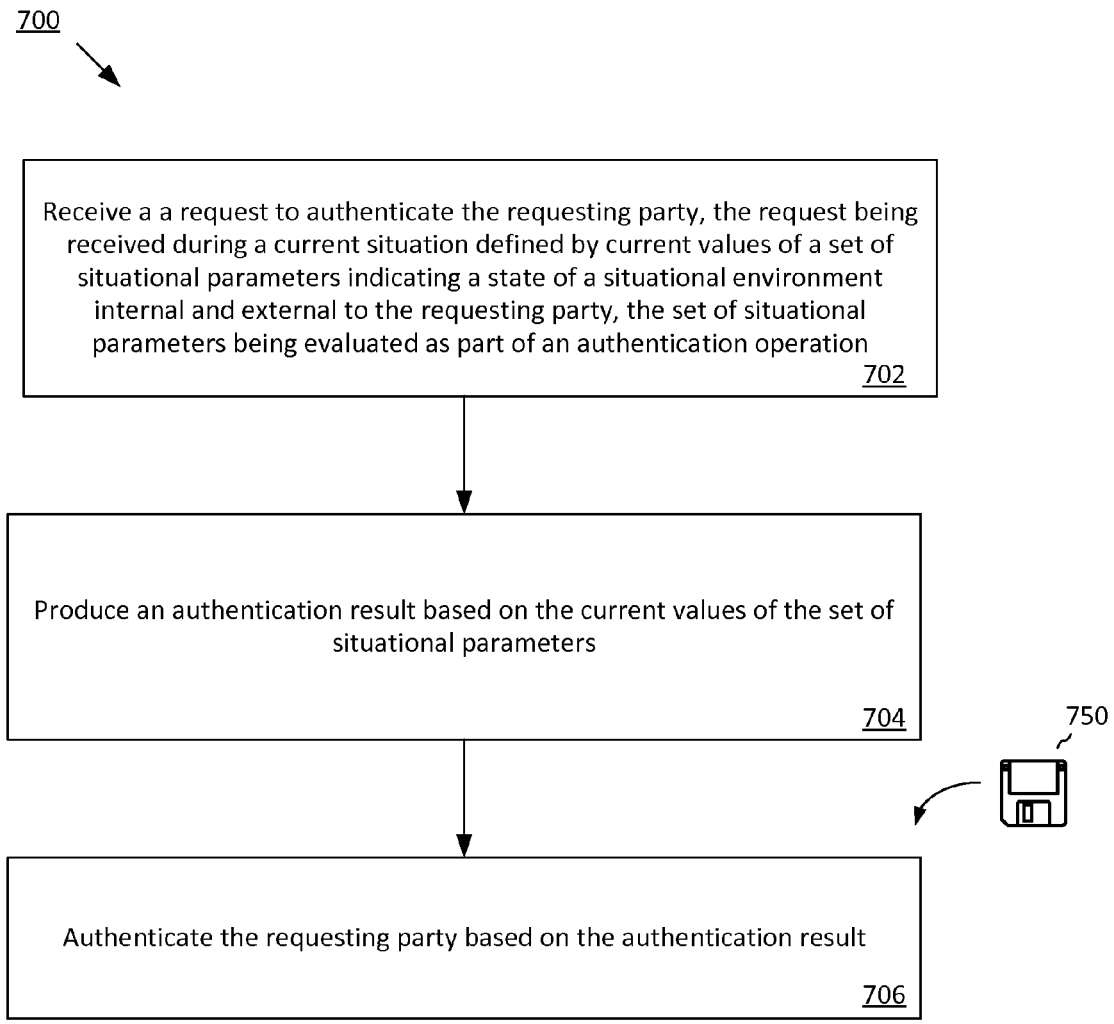
FIG. 7 is a flow chart illustrating an example method of carrying out the improved technique within the electronic environment shown in FIG. 1.

FIG. 7 illustrates a method 700 of authenticating a requesting party, including steps 702, 704, and 706.

In step 702, an authentication server receives a request to authenticate the requesting party, the request being received during a current situation defined by current values of a set of situational parameters indicating a state of a situational environment internal and external to the requesting party, the set of situational parameters being evaluated as part of an authentication operation. For example, authentication server 120 may receive an explicit request in response to a request to access restricted resources such as a bank account of user 114. In other scenarios, however, authentication server 120 may simply be practicing continuous authentication and is readying for another authentication instance. Authentication server 120 is situationally aware, so that authentication server has assessed current situation 128 as it readies to perform authentication.

In step 704, the authentication server produces an authentication result based on the current values of the set of situational parameters. For example, authentication server 120 carries out a selected authentication method 134 based on a likelihood of success in authenticating user 114. The result of such an authentication may translate into a risk score.

In step 706, the authentication server authenticates the requesting party based on the authentication result. For example, authentication server 120 verifies authentication factor 112($m$) based on the received risk score.

Improved techniques involve selecting a set of authentication factors from among multiple factors based on a current situation and information about how well the multiple authentication factors have worked in similar situations in the past. An example of such techniques has been described here in terms of authentication server 120 and its components. Authentication server 120 is able to accomplish such techniques by defining a set of situations and extracting from external feeds a current situation 128. From current situation 128, authentication server 120 is able to find the best authentication operation to use based on historical authentication data for the current situation 128. This is marked improvement over conventional authentication techniques that did not use numerical data to assign a level of risk in authentication in various ways according to a variety of situations, but rather use the same authentication technique regardless of the situation.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to authentication server 120, which is constructed and arranged to verify an identity of a user. Some embodiments are directed to a process of verifying an identity of a user. Also, some embodiments are directed to a computer program product that enables computer logic to cause a computer to verify an identity of a user.

In some arrangements, authentication server 120 is implemented by a set of cores or other types of control/processing circuitry running software. In such arrangements, the software instructions can be delivered, within authentication server 120, either in the form of a computer program product 750, or simply instructions on disk or pre-loaded in memory 132 of authentication server 120, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of authenticating a requesting party, the method comprising:
receiving a request to authenticate the requesting party, the request being received during a current situation defined by current values of a set of situational parameters indicating a state of a situational environment internal and external to the requesting party, the set of situational parameters being evaluated as part of an authentication operation;
producing an authentication result based on the current values of the set of situational parameters;
authenticating the requesting party based on the authentication result;
receiving updated values of the set of situational parameters;
producing a difference between the updated values of the situational parameters and the current values of the situational parameters, the difference being larger than a threshold value,
re-authenticating the requesting party; and
selecting an authentication operation that verifies first authentication factors of a set of authentication factors of the requesting party, verification of the first authentication factors being more likely to successfully authenticate the requesting party than second authentication factors of the set of authentication factors, given that the values of the set of the situational parameters are equal to the current values
wherein selecting the authentication operation includes performing a read operation on a situational authentication table, the situational authentication table including rows and columns, each row corresponding to values of the set of situational parameters, each column corresponding to an authentication factor of the user, each entry at a row and column of the situational authentication table including a likelihood that verification of the authentication factor to which that column corresponds given the values of the set of situational parameters to which that row corresponds implies authentication of the requesting party.

2. A method as in claim 1, wherein receiving the updated values of the set of situational parameters includes obtaining the updated values as part of a continuous process.

3. A method as in claim 1, wherein receiving the updated values of the set of situational parameters includes obtaining the updated values on a periodic basis.

4. A method as in claim 1, further comprising, prior to receiving the request:
enumerating a set of situational parameters;
enumerating a set of authentication factors for the requesting party; and
computing the likelihood that, for values of the set of situational parameters, verification of the values of the set of authentication authenticates the requesting party.

5. A method as in claim 4, wherein computing the likelihood includes:
accessing a database containing historical data indicating success and failure of authenticating users using authentication operations that verify identification factors of the set of identification factors for given values of the set of situational parameters; and
for values of the set of situational parameters in the accessed database and each identification factor verified for those values, generating the likelihood of that identification factor authenticating the requesting party for those values based on the historical data.

6. A method as in claim 5, wherein generating the likelihood includes:
inputting the historical data into a machine learning system arranged to (i) reward authentication factors that, when verified, resulted in successful identity verification, and/or (ii) penalize authentication factors that, when verified, resulted in unsuccessful identity verification; and
extracting likelihood values from the machine learning system.

7. A method as in claim 6, wherein inputting the historical data into the machine learning system includes forming a correlation matrix from the historical data, the correlation matrix having M rows and N columns, each of the M rows indicating values of the set of situations, each of the N columns indicating an authentication factor of the set of identification factors; and
wherein extracting the likelihood values includes performing a singular value decomposition (SVD) on the correlation matrix, the SVD producing singular values identifying authentication factors and values of the situational parameters most strongly correlated.

8. A method as in claim 1, wherein the situational authentication table is included in an authentication selection policy, the authentication selection policy further including a set of rules for selecting authentication operations in risk environments of a set of risk environments;
wherein selecting the authentication operation includes ceasing authentication operations when a current risk environment indicates sufficiently high risk, cessation of authentication operations indicating a blocking of access to resources that would be granted when an identity has been verified.

9. A method as in claim 1, further comprising:
obtaining values of the set of situational parameters from an internet data feed; and
mapping the values to at least one enumerated situation of the situational authentication table.

10. A method as in claim 9, wherein obtaining the values includes:
observing postings on a social media web site via the internet data feed, and
extracting a posting when the posting contains any of a set of predefined situational keywords.

11. A method as in claim 1,
wherein the requesting party is a computing device configured to transmit authentication requests to an authentication server over a computer network,
wherein producing the authentication result is performed by the authentication server after receiving the request to authenticate from the computing device, and
wherein the state of the situational environment internal to the requesting party includes applications running on the computing device.

12. An electronic apparatus constructed and arranged to authenticate a requesting party, the apparatus comprising:
a network interface;
memory; and
a controller having controlling circuitry coupled to the memory, the controlling circuitry being constructed and arranged to:
receive a request to authenticate the requesting party, the request being received during a current situation defined by current values of a set of situational parameters indicating a state of a situational environment internal and external to the requesting party, the set of situational parameters being evaluated as part of an authentication operation;

produce an authentication result based on the current values of the set of situational parameters; and authenticate the requesting party based on the authentication result, wherein the controlling circuitry is further constructed and arranged to select an authentication operation that verifies first authentication factors of a set of authentication factors of the requesting party, verification of the first authentication factors being more likely to successfully authenticate the user than second authentication factors of the set of authentication factors, given that the values of the set of the situational parameters are equal to the current values, and wherein the controlling circuitry constructed and arranged to select the authentication operation is further constructed and arranged to perform a read operation on a situational authentication table, the situational authentication table including rows and columns, each row corresponding to values of the set of situational parameters, each column corresponding to an authentication factor of the user, each entry at a row and column of the situational authentication table including a likelihood that verification of the authentication factor to which that column corresponds given the values of the set of situational parameters to which that row corresponds implies authentication of the requesting party.

13. An apparatus as in claim 12, wherein the controlling circuitry is further constructed and arranged to:

receive updated values of the set of situational parameters;

produce a difference between the updated values of the situational parameters and the current values of the situational parameters, the difference being larger than a threshold value; and re-authenticate the requesting party.

14. An apparatus as in claim 13, wherein the controlling circuitry constructed and arranged to receive the updated values of the set of situational parameters is further constructed and arranged to obtain the updated values as part of a continuous process.

15. An apparatus as in claim 13, wherein the controlling circuitry constructed and arranged to receive the updated values of the set of situational parameters is further constructed and arranged to obtain the updated values on a periodic basis.

16. A computer program product comprising a non-transitory, computer-readable storage medium which stores code, the code including a compiler which when executed by a computer configured to authenticate a requesting party, causes the computer to:

receive a request to authenticate the requesting party, the request being received during a current situation defined by current values of a set of situational parameters indicating a state of a situational environment internal and external to the requesting party, the set of situational parameters being evaluated as part of an authentication operation;

produce an authentication result based on the current values of the set of situational parameters;

authenticate the requesting party based on the authentication result; and selecting an authentication operation that verifies first authentication factors of a set of authentication factors of the requesting party, verification of the first authentication factors being more likely to successfully authenticate the requesting party than second authentication factors of the set of authentication factors, given that the values of the set of the situational parameters are equal to the current values, wherein selecting the authentication operation includes performing a read operation on a situational authentication table, the situational authentication table including rows and columns, each row corresponding to values of the set of situational parameters, each column corresponding to an authentication factor of the user, each entry at a row and column of the situational authentication table including a likelihood that verification of the authentication factor to which that column corresponds given the values of the set of situational parameters to which that row corresponds implies authentication of the requesting party.

\* \* \* \* \*